United States Patent [19]

Garrett et al.

[11] 4,222,310
[45] Sep. 16, 1980

[54] BRAKE ACTUATOR FASTENER ASSEMBLY

[75] Inventors: Wayne H. Garrett, Troy; Richard F. Neuman, Farmington, both of Mich.

[73] Assignee: Eaton Corporation, Cleveland, Ohio

[21] Appl. No.: 966,345

[22] Filed: Dec. 4, 1978

[51] Int. Cl.³ .......................... F01B 29/00; F16J 1/10; F16J 15/18

[52] U.S. Cl. ..................................... 92/128; 92/129; 92/168; 85/36; 403/361; 403/372

[58] Field of Search .......................... 92/129, 168, 128; 85/36, 80, 85; 403/361, 372; 188/727, 370, 343; 74/18.2, 110

[56] References Cited

U.S. PATENT DOCUMENTS

| | | | |
|---|---|---|---|
| 3,362,506 | 1/1968 | Mossey | 74/110 |
| 3,375,749 | 4/1968 | Coldren et al. | 85/85 |
| 3,391,646 | 7/1968 | Schlosser | 74/18.2 |
| 3,395,584 | 8/1968 | Cox et al. | 188/343 |
| 3,572,478 | 3/1971 | Nagel et al. | 188/79.5 |
| 4,064,973 | 12/1977 | Deem et al. | 188/71.9 |
| 4,071,159 | 1/1978 | Robinson et al. | 85/36 |

Primary Examiner—Paul E. Maslousky
Attorney, Agent, or Firm—R. J. McCloskey; D. Wood

[57] ABSTRACT

A vehicular air disc brake of the wedge actuator type in which the wedge actuator is secured to the air motor by an annular fastener which is snap locked in place in a blind bore in the free end of the wedge actuator and which acts to secure the free end of the piston rod of the air motor to the wedge actuator in response to generally linear movement of the piston rod into the fastener. The fastener is split to allow insertion into the blind bore in the free end of the wedge actuator, and includes a plurality of finger portions which together define a single helical thread disposed within the blind bore; this single thread allows the threads on the air motor piston rod to ratchet therepast upon insertion of the piston rod, allows the piston rod to be threaded out of the fastener for disassembly purposes, and, in the event of inadvertent backing out rotation of the piston rod, allows the piston rod to reseat in the blind bottom of the wedge actuator brake in response to the next actuation of the air motor.

13 Claims, 5 Drawing Figures

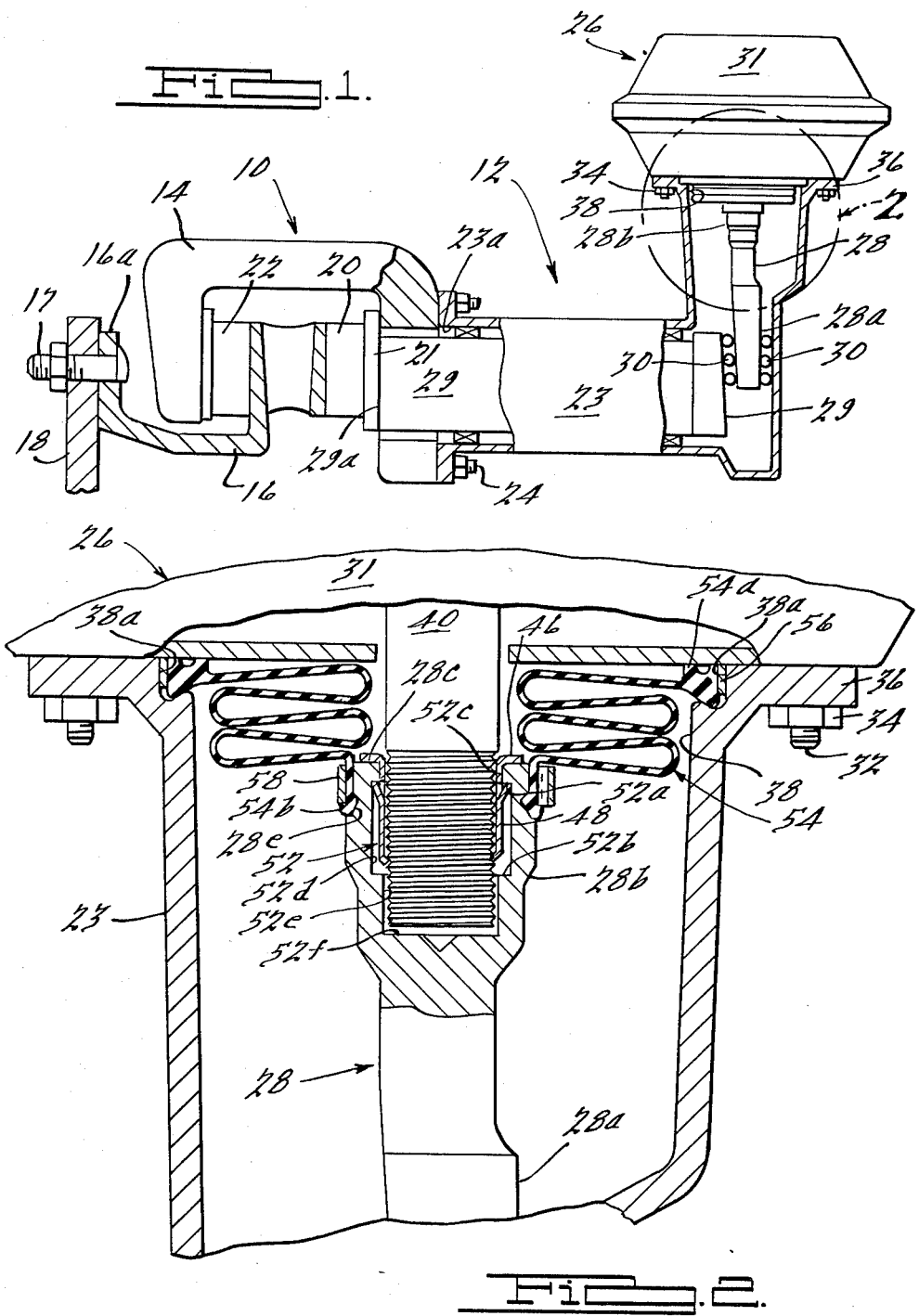

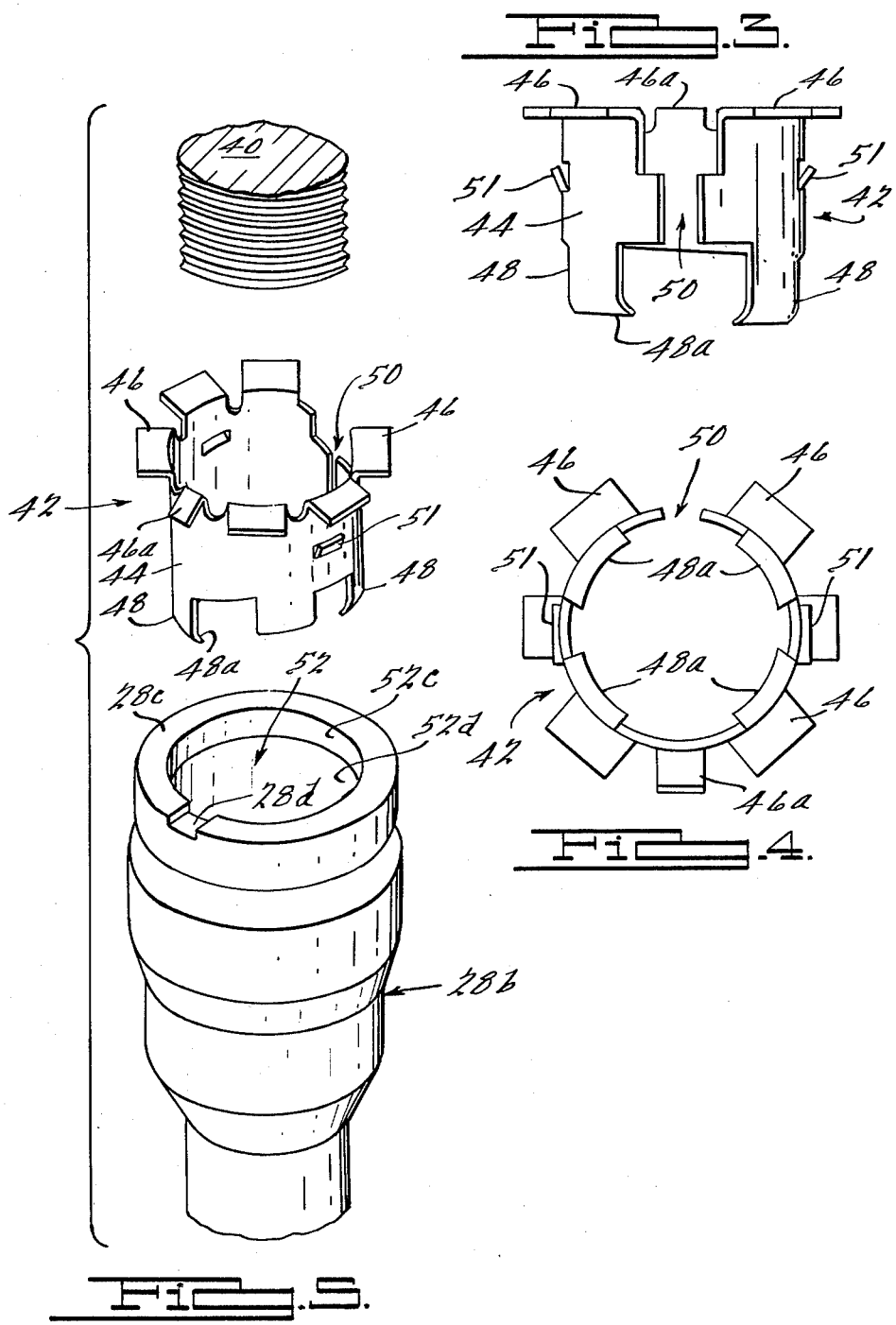

BRAKE ACTUATOR FASTENER ASSEMBLY

BACKGROUND OF THE INVENTION

This invention relates to an actuator assembly for a vehicle brake. Specifically, this invention relates to an improved fastener arrangement for a brake actuator of the wedge type and, more specifically, to an improved fastener arrangement for a wedge type brake actuator for use with an air brake system for a heavy duty truck application.

Heavy duty truck air brake systems typically are of the drum type in which the brake actuator basically comprises a lever member which is secured to the piston rod of the air motor by means of a clevis. Increasingly, however, wedge type actuators are finding application in heavy duty truck air brake systems. These wedge type actuators are typically employed in a disc brake environment, as in the present disclosure, but they may also be used in a drum brake environment. In either environment, the manner in which the piston rod of the air motor is fastened to the wedge actuator becomes critical. Specifically, in the case of lever type actuators, the attachment of the threaded piston rod of the standard air motor to the actuator is readily accomplished by the use of a clevis including a threaded bore into which the rod is secured (e.g., see FIG. 1 of U.S. Pat. No. 4,094,390). The brake supplier typically provides the actuator assembly, less air motor, to the original equipment manufacturer (OEM) who then fastens the air motor to the actuator as a part of the vehicle assembly process. In the case of a wedge type actuator, however, it is important that the actuator assembly, once assembled by the supplier, not be opened up to allow contaminants to enter the critical interface between the wedge actuator and the tappet member driven by the wedge. Prior art wedge actuator designs have either required that the OEM open up the actuator assembly to accomplish the attachment of the standard threaded piston rod to the wedge actuator, or have required that the piston rod of the air motor be customized in a manner to facilitate its attachment to the wedge actuator. The prior art designs requiring the OEM to open up the actuator assembly to accomplish the attachment are undesirable since the potential for contaminates entering the wedge interface area during the attachment process is quite high. The prior art designs requiring a customized piston rod are undesirable in that they require the OEM, as well as the various field service organizations, to inventory separate air motors for lever type actuators and wedge type actuators. Alternatively, the suppliers providing a wedge actuator requiring a customized piston rod may choose to themselves assemble the air motor to the actuator assembly and deliver the completed assembly to the OEM. This alternative precludes contamination of the wedge interface, since the actuator need not be opened up by the OEM, and simplifies the inventory requirement of the OEM, since the air motor, although customized, is provided by the brake supplier. However, this alternative detracts from the brake assembly flexibility of the OEM, and fails to address the inventory problems of the field service organizations.

SUMMARY OF THE INVENTION

Accordingly, it is an object of the present invention to provide an improved brake actuator of the wedge type.

More specifically, it is an object of the present invention to provide a wedge type brake actuator which is readily attachable to the piston rod of an associated air motor.

A yet more specific object is to provide a wedge type brake actuator which may be readily attached to the standard piston rod of an associated air motor without disassembling the actuator.

The invention fastener arrangement has particular applicability in an air brake assembly of the type including an actuator housing having an opening which is closed by the associated air motor in the final assembly operation, and a wedge type actuator member mounted in the housing for reciprocal brake apply and release movement. According to an important feature of the invention, the wedge actuator member has a free end portion deposed adjacent the opening in the actuator housing and fastener means, carried by the free end portion of the wedge actuator, and adapted to operate to secure the piston rod of the associated air motor to the free end portion in response to generally linear movement of the air motor from a preassembly position, in which the air motor is adjacent but spaced from the housing opening with its piston rod positioned adjacent the free end portion, to its securely assembled position closing the opening. This arrangement allows the use of a standardized air motor with a standardized piston rod, and allows attachment of the air motor to the actuator without opening up the actuator.

According to another feature of the invention, the actuator further includes a tappet mounted interiorly of the actuator housing for reciprocal, sliding brake apply and return movement; the wedge actuator member moves along a line of action intersecting the path of sliding movement of the tappet and includes a wedge portion cammingly coacting with the tappet; and the movement of the air motor in the fastening operation is generally along the line of action of the wedge actuator member. This arrangement simplifies the assembly procedure since any method of limiting or preventing movement of the actuator member along its line of action also provides the reaction force necessary to accomplish securement of the air motor to the actuator member.

According to a further feature of the invention, the actuator further includes a flexible annular seal which is sealingly engaged at its outer periphery with the actuator housing generally adjacent the circumference of the housing opening and at its inner periphery with the outer periphery of the free end portion of the actuator member, and the fastener means carried by the free end portion of the actuator member are positioned generally within the inner periphery of the annular seal. This arrangement allows the actuator to be shipped as a sealed unit to the original equipment manufacturer who may thereafter readily assemble the piston rod of a standard air motor to the actuator without violating the sealed status of the actuator.

According to a further feature of the invention, the free end portion of the actuator member comprises a rod portion having a blind central bore opening at the end face of the rod portion and having a central longitudinal axis coaxial with the line of action of the actuator member; and the fastener means includes thread means positioned within the bore at a location spaced axially from the blind bottom of the bore and adapted to resiliently expand to allow the threads on the piston rod of the associated air motor to ratchet therepast and allow the piston rod to bottom in the bore. With this arrangement, the piston rod may be secured to the rod portion of the actuator member simply by axial insertion of the piston rod into the blind bore with the threads on the piston rod ratcheting past the thread means in the bore to allow the piston rod to bottom in the bore and provide a solid driving connection between the piston rod and the rod portion. The thread means in the bore are configured to preclude axial withdrawal of the piston while allowing threaded withdrawal of the rod for disassembly purposes. The described arrangement also provides a self correcting feature in that, in the event that the piston rod is not fully inserted during the initial assembly operation, or in the event that the piston rod over a period of extended operation inadvertently reverse threads itself upwardly away from the bottom of the bore, the next brake apply stroke of the air motor will firmly seat - or reseat - the piston rod against the bottom of the bore.

In the disclosed embodiment of the invention, the fastener means comprises a fastener member which is formed of a resilient material and which includes a circumferentially split tubular main body portion securedly positioned within the bore, and a plurality of circumferentially spaced thread fingers extending axially from the axially inner end of the main body portion and thereafter bending radially inwardly to define a series of circumferentially spaced thread portions lying on a single helix to cumulatively and effectively define a single thread spaced axially outwardly from the blind bottom of the bore. The thread finger portions resiliently flex in response to insertion of the piston rod of the associated air motor to allow the threads of the piston rod to ratchet past the thread finger portions and bottom in the bore, whereafter the thread finger portions function to preclude axial withdrawal of the piston rod but allow threaded withdrawal.

These and other objects, features and advantages of the invention will be apparent from the accompanying drawings and from the attached description of the preferred embodiment.

BRIEF DESCRIPTION OF THE DRAWINGS

FIG. 1 is a somewhat schematic, partially fragmentary view of vehicular brake assembly embodying the invention actuator assembly;

FIG. 2 is a view on an enlarged scale, and partially in section, of the portion of the brake assembly of FIG. 1 within the circle 2;

FIGS. 3 and 4 are elevational and plan views, respectively, of a fastener member forming part of the present invention; and FIG. 5 is a perspective, exploded view showing the assembly relationship of the fastener member of FIGS. 3 and 4 to other elements of the invention actuator.

DESCRIPTION OF THE PREFERRED EMBODIMENT

The vehicle brake assembly of FIG. 1 includes a caliper disc brake assembly 10 and an associated actuator assembly 12.

Caliper disc brake assembly 10 includes a caliper 14 adapted to be slideably mounted on a fixed portion (e.g., an axle housing) of an associated vehicle, a disc 16 embraced by caliper 14 and secured by bolts 17 to a wheel 18 of an associated vehicle, and inboard and outboard brake pads 20 and 22.

Actuator assembly 12 includes a generally L-shaped housing 23 secured at one end by bolts 24 to the inboard face of caliper 14, an air motor 26 secured to the other end of housing 23, a wedge actuator member 28 driven by the air motor, and a tappet 29 driven by a wedge portion 28a of actuator member 28 through roller bearing assemblies 30. The free end 29a of tappet 29 extends through opening 23a in housing 23 and through a suitable opening in caliper 14 to act against backing plate 21 of inboard brake pad 20 to press pad 20 against the inboard face of disc 16 and thereafter slide the entire brake mechanism to the right to in turn apply outboard pad 22 against the outboard face of disc 16, whereby to brake wheel 18 of the associated vehicle, all in known manner. As seen in FIG. 2, air motor 26 includes a casing 31 carrying studs 32 which pass through holes in flange 36 of actuator housing 23 for engagement by nuts 34 to secure the air motor to housing 23 in a position in which the casing 31 of the air motor closes the housing opening 38 defined within flange 36 and the piston rod 40 of the air motor projects into that opening for securement to wedge member 28.

The present invention relates particularly to the manner in which wedge member 28 is fastened to the piston rod 40 of air motor 26. Broadly considered, piston rod 40 is fastened to wedge member 28 by a fastener member 42 received in a suitably configured end portion 28b of wedge member 28.

Fastener member 42 is seen in elevational and plan detail in FIGS. 3 and 4; in assembled relation to the piston rod and wedge member in FIG. 2; and in exploded relation to the piston rod and wedge member in FIG. 5.

Fastener member 42 is preferably formed as a high carbon spring steel stamping and includes a main body tubular portion 44, a plurality of circumferentially spaced flange finger portions 46, and a plurality of circumferentially spaced thread finger portions 48.

Tubular main body portion 44 is circumferentially split at 50 to allow resilient radial contraction and expansion of the fastener, and a pair of diametrically opposed tangs 51 are struck radially outwardly from tubular portion 44 with their free ends oriented toward flange finger portions 46.

Flange finger portions 46 extend radially outwardly from one end of tubular portion 44. Finger portions 46 all lie in a plane generally normal to the central axis of tubular portion 44 with the exception of a diminutive finger portion 46a which is bent downwardly out of that plane.

Thread finger portions 48 extend axially from the other end of tubular portion 44 and thereafter bend radially inwardly, through an angle of approximately 85°, to define a series of circumferentially spaced thread portions 48a. Thread portions 48a are arranged to lie on a single helix so that the several thread portions cumulatively and effectively define a single helical thread centered on the axis of tubular main body portion 44.

End portion 28b of wedge actuator 28 has a rod configuration and is radially enlarged to accommodate a blind central bore 52 provided in end portion 28b and opening at the end face 28c of that portion.

Blind bore 52 has a longitudinal central axis which is coaxial with the line of action of wedge actuator member 28. Bore 52 is twice stepped at 52a and 52b to provide a neck portion 52c adjacent end face 28c, a radially enlarged portion 52d located axially inwardly of neck portion 52c, and a counterbore portion 52e adjacent blind bottom 52f. The diameter of counterbore portion 52e is slightly greater than that of piston rod 40, and the diameter of neck portion 52c is slightly larger than that of counterbore portion 52e.

Fastener member 44 is secured in blind bore 52 by the actuator manufacturer prior to delivery to the original equipment manufacturer. This is accomplished by pushing fastener 42 into bore 52 with thread finger portions 48 leading. As fastener 42 enters the bore, tubular main body portion 44 contracts radially to allow tangs 51 to pass through neck portion 52c whereafter the main body portion expands to allow the tangs to engage step or shoulder 52a as flange finger portions 46 seat on end face 28c. The fastener is thus securely positioned in bore 52 with thread finger portions 48 received within radially enlarged bore portion 52d and the single cumulative thread defined by thread portions 48a spaced axially outwardly from the blind bottom 52f of the bore. Rotary movement of the fastener within the bore is precluded by receipt of diminutive flange finger 46a in a notch 28d (FIG. 5) provided in end face 28c.

An annular flexible boot seal 54 is provided to preclude contamination of the critical camming interface between wedge member 28 and tappet 29. Seal 54 has a generally bellows configuration and is formed of a flexible, elastomeric, petroleum resistant material such, for example, as neoprene or buna-N. Seal 54 has a thickened outer peripheral portion 54a which is seated in a circumferential groove 38a provided in housing 23 adjacent opening 38. Thickened portion 54a is maintained in sealing engagement with groove 38a by a split spring steel retainer ring 56. Seal 54 also includes a thickened inner peripheral portion 54b which is received in an external groove 28e in end portion 28b and maintained in sealing engagement with that groove by a crimp clamp 58. Boot seal 54 would normally be installed by the actuator manufacturer prior to delivery to the original equipment manufacturer.

Although the air motor could readily be assembled to the actuator by the actuator manufacturer, it is contemplated that the actuator assembly, complete with installed fastener 42 and installed boot seal 54, would normally be delivered to the original equipment manufacturer for assembly of the air motor to the actuator as a part of the overall vehicle assembly procedure. A temporary cover (not shown) would normally be positioned over opening 38 to preclude displacement of the boot seal, and entry of contaminants into bore 52, during the handling of the actuator following assembly by the actuator manufacturer and prior to final assembly by the original equipment manufacturer. Whether performed by the actuator manufacturer or the original equipment manufacturer, the assembly of the air motor to the actuator is readily and simply accomplished. Specifically, after removal of the temporary cover, if present, the air motor is positioned adjacent but spaced from opening 38a with its piston rod 40 positioned adjacent the open end of bore 52 in end portion 28b and in axial alignment with the central axis of that bore and with the line of action of wedge actuator member 28. The air motor is then moved generally along this line of action to pass studs 32 through the holes in flange 36 and insert the rod 40 in bore 52. As rod 40 moves axially into bore 52, it passes through fastener tubular main body portion 44 and is forced past thread portions 48a with finger portions 48 resiliently flexing radially outwardly within radially enlarged bore portion 52d to allow thread portions 48a to ratchet over the successive threads on the rod 40 until rod 40 seats within counterbore 52c and against the blind bore bottom 52f, thereby providing a solid driving connection between rod 40 and actuator member 28. Following insertion of rod 40, nuts 34 are threaded onto studs 32 to fixedly secure the air motor casing to the actuator housing. Since the insertion of rod 40 into fastener 42 is along the line of action of actuator 28, any method of limiting or preventing movement of the actuator member along its line of action also provides the reaction force necessary to accomplish insertion of the air motor piston rod into the actuator. For example, if shoes 20, 22 and disc 16 are already in place at the time that the air motor is assembled to the actuator, the brake apply movement of the actuator is limited by engagement of shoes 20, 22 with disc 16 to provide the necessary reaction force; or alternately, if the shoes and disc are not in place, a suitable tool can be inserted through a suitable opening in housing 23 to arrest the brake apply movement of the actuator and provide the necessary reaction force.

With piston rod 40 fully inserted in fastener 42 with the rod end bottomed in bore 52, any outward or axial withdrawal of the piston rod will be precluded by the angled configuration of thread portions 48a which act as pawls coacting with the notches defined by the thread teeth on the piston rod to preclude such axial withdrawal. To disassemble the air motor from the actuator, nuts 34 may be removed and the air motor pressurized to extend the piston rod and push the air motor casing away from flange 36 to disengage studs 32, whereafter the air motor may be rotated counterclockwise to rotate piston 40 in fastener 42 and screw the rod out of the fastener with thread portions 48a coacting with the piston rod threads to provide the unscrewing action.

If the air motor assembly step is imperfectly performed with the result that the piston rod is not completely bottomed in blind bore 52, the rod will automatically ratchet axially inwardly to a bottoming configuration in response to the first brake apply actuation of the air motor. Similarly, if, over an extended period of operation of the actuator, piston rod 40 works loose from the piston member in the air motor and reverse threads itself upwardly away from the bottom of the bore, the rod will automatically reseat itself in the bottom of the bore in response to the first brake apply actuation of the air motor occurring after the rod has undergone one full unscrewing turn. The inadvertent backing out rotation of the piston rod is thus limited to one full turn, whereafter the rod is automatically reseated.

The invention fastener assembly will be seen to provide many advantages. Since it allows a wedge type actuator to readily accept a standardized air motor with a standardized threaded piston rod, the original equipment manufacturer may satisfy customer specifications calling for both lever type and wedge type actuators and yet need only inventory one air motor—or one family of air motors—for both actuator types. This inventory simplification also extends to the various field service organizations, significantly simplifying service operations at all levels. And the invention fastener assembly allows the standardized air motor with standardized threaded piston to be used with a wedge type actuator without the necessity of opening up the actuator assembly to accomplish attachment of the piston rod to the actuator, thereby eliminating the high risk of contamination of the wedging interface attendant upon such opening up.

Whereas a preferred embodiment of the invention has been illustrated and described in detail, it will be apparent that various changes and modifications may be made in the disclosed embodiment without departing from the scope or spirit of the invention.

What is claimed is:

1. A brake actuator adapted for use with an air motor of the type including a motor casing and a piston rod projecting from said casing and having a threaded free end portion; said actuator comprising:
   A. an actuator housing defining an opening providing access to the interior of said housing;
   B. attachment means on said housing adjacent said opening adapted to coact with attachment means on the casing of the associated air motor to securedly assemble the casing to said housing in a position closing said opening;
   C. an actuator mechanism positioned interiorly of said housing and including an actuator member mounted within said housing for reciprocal brake apply and release movement and having a free end portion disposed adjacent said opening; and
   D. fastener means carried by said free end portion of said actuator member and adapted to operate to ratchedly receive the threaded free end portion of the piston rod of the associated air motor in response to generally linear movement of the air motor relative to said housing from a preassembly position, in which it is adjacent but spaced from said opening with the threaded free end portion of its piston rod positioned adjacent said free end portion of said actuator member, to its securedly assembled position closing said opening, whereby to secure the free end portion of the piston rod to said free end portion of said actuator member.

2. A brake actuator adapted for use with an air motor of the type including a motor casing and a piston rod projecting from said casing and having a threaded free end portion; said actuator comprising:
   A. an actuator housing defining a first opening, and a second opening spaced from said first opening;
   B. attachment means adjacent said first opening adapted to coact with attachment means on the casing of the associated air motor to securedly assemble the casing to said housing in a position closing said first opening;
   C. an actuator mechanism positioned interiorly of said housing and including:
      1. a first actuator member mounted within said housing for reciprocal brake apply and release movement and having a free end portion disposed adjacent said first opening; and
      2. a second actuator member mounted within said housing for reciprocal brake apply and release movement in response to corresponding movement of said first actuator member and having a free end portion disposed adjacent said second opening and adapted to actuate suitable braking elements to perform the braking function; and
   D. fastener means carried by said free end portion of said first actuator member and adapted to operate to ratchedly receive the threaded free end portion of the piston rod of the associated air motor in response to generally linear movement of the air motor relative to said housing from a pre-assembly position in which it is adjacent but spaced from said first opening, with the threaded free end portion of its piston rod positioned adjacent said free end portion of said first actuator member, to its securedly assembled position closing said first opening, whereby to secure the free end portion of the piston rod to said free end portion of said first actuator member.

3. A brake actuator adapted for use with an air motor of the type including a motor casing and a piston rod projecting from said casing and having a threaded free end portion; said actuator comprising:
   A. an actuator housing defining an opening providing access to the interior of said housing;
   B. attachment means on said housing adjacent said opening adapted to coact with attachment means on the casing of the associated air motor to securedly assemble the casing to said housing in a position closing said opening;
   C. an actuator mechanism positioned interiorly of said housing and including:
      1. a tappet mounted interiorly of said housing for reciprocal, sliding brake apply and return movement; and
      2. a wedge member mounted in said housing for movement along a line of action intersecting the path of sliding movement of said tappet and including a wedge portion disposed interiorly of said housing for camming coaction with said tappet and a free end portion disposed adjacent said opening; and
   D. fastener means carried by said free end portion of said wedge member and adapted to operate to ratchedly receive the threaded free end portion of the piston rod of the associated air motor in response to movement of the associated air motor relative to said housing generally along said line of action from a pre-assembly position in which it is adjacent but spaced from said opening, with the threaded free end portion of its piston rod generally coaxial with said line of action and adjacent said free end portion of said wedge member, to its securedly assembled position closing said opening, whereby to secure the free end portion of the piston rod to said free end portion of said wedge member.

4. A brake actuator adapted for use with an air motor of the type including a motor casing and a piston rod projecting from said casing; said actuator comprising:
   A. an actuator housing defining an opening providing access to the interior of said housing;
   B. attachment means on said housing adjacent said opening adapted to coact with attachment means on the casing of the associated air motor to securedly assemble the casing to said housing in a position closing said opening;
   C. an actuator mechanism positioned interiorly of said housing and including an actuator member mounted within said housing for reciprocal brake apply and release movement along a line of action generally normal to the plane of said opening and having a free end portion disposed adjacent and generally concentrically within said opening;
   D. a flexible, annular seal sealingly engaged at its outer periphery with said housing generally adjacent the circumference of said opening and sealingly engaged at its inner periphery with the outer periphery of said free end portion, whereby to seal said opening to preclude contamination of the interior of said housing without impeding the aforesaid brake apply and release movement of said actuator member along said line of action; and fastener means carried by said free end portion of said actuator member within the inner periphery of said annular seal and adapted to operate to secure the piston rod of the associated air motor to said free end portion in response to movement of the associated air motor relative to said housing generally along said line of action from a pre-assembly position in which it is adjacent but spaced from said opening, with its piston rod generally coaxial with said line of action and adjacent said free end postion, to its securedly assembled position closing said opening.

5. A brake actuator according to claims 1, 2, or 3 wherein:
F. said free end portion comprises a rod portion having a blind central bore opening at the end face of said rod portion and having a central longitudinal axis coaxial with the line of action of said actuator member; and
G. said fastener means comprises:
1. means defining thread means positioned within said bore at a location spaced axially from the blind bottom of said bore,
2. means operative in response to insertion of the piston rod of the associated air motor into said bore to allow said thread means to resiliently expand radially to allow the threads on the free end portion of the piston rod to ratchet therepast and allow the piston rod to bottom on said blind bottom, and
3. means operative to preclude such resilient radial expansion of said thread means in response to attempted axial withdrawal of the piston rod whereby the piston rod of the associated air motor may be secured to said rod portion by axial insertion of the piston rod into said blind bore with the threads on the free end portion of the piston rod ratcheting past said thread means to allow the piston rod to bottom in said bore to provide a solid driving connection between the piston rod and said rod portion; the piston rod may be separated from said rod portion by threading the piston rod out of the bore; and, in the event of inadvertent backing out rotation of the piston rod in the bore over an extended period of operation of the broke actuator, such backing out rotation is limited to one complete rotation since the piston rod will thereafter ratchet past the thread means and again bottom in the blind bore in response to the next brake apply cycle.

6. A brake actuator according to claims 1, 2 or 3 wherein
F. said free end portion is provided with a concavity opening at the free end face of said free end portion; and
G. said fastener means includes a generally annular fastener member securely positioned within said concavity and operative to securely engage the piston rod of the associated air motor in response to insertion of the rod coaxially into said fastener member.

7. A brake actuator according to claim 6 wherein

H. said free end portion comprises a rod portion having a central longitudinal axis coaxial with the line of action of said actuator member;
I. said concavity comprises a blind central bore in said rod portion opening at the end face of said rod portion; and
J. said fastener member includes
1. a generally tubular main body portion positioned within said bore,
2. securement means positioned exteriorly of said tubular main body portion for securing said fastener member within said bore, and
3. thread means positioned interiorly of said tubular main body portion and operative to threadably engage the threads of the piston rod of the associated air motor.

8. A brake actuator according to claim 7 wherein:
K. said fastener member is formed of a resilient material;
L. said securement means comprises tangs struck from said tubular main body portion and flange means at the axially outer end of said main body portion;
M. said bore is stepped to provide a neck portion adjacent the end face of said rod portion, a radially enlarged portion axially inwardly of said neck portion, and a shoulder at the step between said bore portions; and
N. said tubular main body portion is split whereby when said fastener member is pushed into said bore, the split tubular main body portion resiliently contracts to allow said tangs to pass through the neck portion of said bore whereafter said main body portion expands to allow said tangs to engage said shoulder as said flange means seat on the end face of said rod portion to thereby secure said fastener member within said bore.

9. A brake actuator according to claim 7 wherein:
K. said fastener member is formed of a resilient material; and
L. said thread means comprises a plurality of finger portions extending axially from the axially inner end of said main body portion and thereafter bending radially inwardly to define a series of thread portions lying on a single helix to cumulatively and effectively define a single thread spaced axially outwardly from the blind bottom of said bore whereby, with said fastener member secured within said bore, the piston rod of the associated air motor may be inserted into said tubular main body portion and forced past said thread portions and bottomed in said bore with said finger portions resiliently flexing to allow said thread portions to ratchet over the successive threads on the piston rod.

10. A brake actuator according to claim 6 wherein:
H. said free end portion comprises a rod portion having a central longitudinal axis coaxial with the line of action of said actuator member;
I. said concavity comprises a blind central bore in said rod portion and stepped to provide a neck portion adjacent said end face, a radially enlarged portion axially inwardly of said neck portion, and a shoulder at the step between said bore portions; and
J. said fastener member comprises a unitary piece formed of spring steel and including 1. a circumferentially split tubular main body portion having tangs struck radially outwardly therefrom,
2. a plurality of circumferentially spaced flange finger portions extending radially outwardly from one end of said main body portion, and
3. a plurality of circumferentially spaced thread finger portions extending axially from the other end of said main body portion and thereafter bending radially inwardly to define a series of circumferentially spaced thread portions lying on a single helix to cumulatively and effectively define a single thread whereby when said fastener member is pushed into said bore, with the other end of said main body portion leading, the split tubular main body portion resiliently contracts to allow said tangs to pass through the neck portion of said bore whereafter said main body portion expands to allow said tangs to engage said shoulder as said flange finger portions seat on the end face of said rod portion to thereby secure said fastener within said bore, and whereby, with said fastener member thus secured in said bore, the piston rod of an associated air motor may be inserted into said main body portion and forced past said thread portions and bottomed in said bore with said thread finger portions resiliently flexing radially outwardly within said radially enlarged portion of said bore to allow said thread portions to ratchet on the successive threads of the piston rod.

11. A brake actuator according to claim 10 wherein:
K. a notch is formed in the end face of said rod portion opening in said bore, and
L. one of said flange finger portions is bent downwardly out of the plane of the remaining flange finger portions and is received in said notch with the fastener member secured within said bore whereby said fastener member is precluded from rotating relative to said rod portion so that, following release of said attachment means, said rod portion may be threaded out of said fastener member to separate the air motor from the actuator.

12. A brake actuator adapted for use with an air motor of the type including a motor casing, a piston rod projecting from said casing, and attachment means on said casing; said actuator comprising:
A. an actuator housing defining an opening providing access to the interior of said housing;
B. an actuator mechanism positioned interiorly of said housing and including an actuator member mounted within said housing for reciprocal brake apply and release movement and having a free end portion disposed adjacent said opening;
C. attachment means on said housing adjacent said opening adapted to coact with the attachment means on the casing of the air motor to positively locate the air motor in an assembled position on said housing, closing said opening, in response to generally linear movement of the associated air motor relative to said housing from a pre-assembly position, in which it is adjacent but spaced from said opening with its piston rod positioned adjacent said free end portion, to its assembled position on said housing closing said opening; and
D. fastener means carried by said free end portion of said actuator member and adapted to operate to secure the piston rod of the associated air motor to said free end portion in response to the aforedescribed generally linear movement of the air motor.

13. A brake actuator comprising:
A. an air motor including
1. a casing;
2. a piston rod projecting from one side of said casing; and
3. a plurality of attachment means on said one casing side at opposite sides of said piston rod;
B. an actuator housing defining an opening providing access to the interior of said housing;
C. an actuator mechanism positioned interiorly of said housing and including an actuator member mounted within said housing for reciprocal brake apply and release movement and having a free end portion disposed adjacent said opening;
D. a plurality of attachment means on said housing at opposite sides of said opening operative to coact with said attachment means on the casing of said air motor to positively locate the air motor in an assembled position on said housing, closing said opening, in response to generally linear movement of said air motor relative to said housing from a pre-assembly position, in which it is adjacent but spaced from said opening with its piston rod positioned adjacent said free end portion, to its assembled position on said housing closing said opening; and
E. fastener means carried by said free end portion of said actuator member and adapted to operate to secure said piston rod of said air motor to said free end portion in response to the aforedescribed generally linear movement of said air motor.

* * * * *